(12) United States Patent  (10) Patent No.: US 7,175,090 B2
Nadabar  (45) Date of Patent: Feb. 13, 2007

(54) METHODS AND APPARATUS FOR READING BAR CODE IDENTIFICATIONS

(75) Inventor: Sateesha G. Nadabar, Framingham, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 167 days.

(21) Appl. No.: 10/930,056

(22) Filed: Aug. 30, 2004

(65) Prior Publication Data
US 2006/0043186 A1 Mar. 2, 2006

(51) Int. Cl.
G06K 7/10 (2006.01)
G06K 9/36 (2006.01)
G06K 9/80 (2006.01)

(52) U.S. Cl. .............. 235/462.1; 235/462.07; 235/462.09

(58) Field of Classification Search ............ 235/462.01, 235/462.1, 462.09, 462.07
See application file for complete search history.

(56) References Cited

U.S. PATENT DOCUMENTS

| | | | |
|---|---|---|---|
| 3,868,634 A | 2/1975 | Dolch | |
| 3,890,597 A | 6/1975 | Hanchett | |
| 4,282,425 A | 8/1981 | Chadima, Jr. et al. | |
| 4,308,455 A | 12/1981 | Bullis et al. | |
| 4,421,978 A | 12/1983 | Laurer et al. | |
| 4,782,220 A | 11/1988 | Shuren | |
| 4,866,784 A | 9/1989 | Barski | |
| 4,894,523 A | 1/1990 | Chadima, Jr. et al. | |
| 4,948,955 A | 8/1990 | Lee et al. | |
| 4,973,829 A | 11/1990 | Ishida et al. | |
| 5,028,772 A | 7/1991 | Lapinski et al. | |
| 5,120,940 A | 6/1992 | Willsie | |
| 5,124,537 A | 6/1992 | Chandler et al. | |
| 5,124,538 A | 6/1992 | Lapinski et al. | |
| 5,155,343 A | 10/1992 | Chandler et al. | |
| 5,187,355 A | 2/1993 | Chadima, Jr et al. | |
| 5,187,356 A | 2/1993 | Chadima, Jr. et al. | |
| 5,262,623 A | 11/1993 | Batterman et al. | |

(Continued)

Primary Examiner—Thien M. Le
Assistant Examiner—Edwyn Labaze
(74) Attorney, Agent, or Firm—David J. Powsner

(57) ABSTRACT

The invention provides methods and appartaus for analysis of images of two-dimensional (2D) bar codes in which a model that has proven successful in decoding of a prior 2D image of a 2D bar code is utilized to speed analysis of images of subsequent 2D bar codes. In its various aspects, the invention can be used in analyzing conventional 2D bar codes, e.g., those complying with Maxicode and DataMatrix standards, as well as stacked linear bar codes, e.g., those utilizing the Codablock symbology. Bar code readers, digital data processing apparatus and other devices according to the invention be used, by way of non-limiting example, to decode bar codes on damaged labels, as well as those screened, etched, peened or otherwise formed on manufactured articles (e.g., from semiconductors to airplane wings). In addition to making bar code reading possible under those conditions, devices utilizing such methods can speed bar code analysis in applications where multiple bar codes of like type are read in succession and/or are read under like circumstances—e.g., on the factory floor, at point-of-sale locations, in parcel deliver and so forth. Such devices can also speed and/or make possible bar code analysis where in applications where multiple bar codes read from a single article—e.g., as in the case of a multiply-encoded airplane propellor or other milled parts. The invention also provides methods and apparatus for optical character recognition and other image-based analysis paralleling the above.

27 Claims, 2 Drawing Sheets

U.S. PATENT DOCUMENTS

| | | |
|---|---|---|
| 5,262,625 A | 11/1993 | Tom et al. |
| 5,276,315 A | 1/1994 | Surka |
| 5,276,316 A | 1/1994 | Blanford |
| 5,278,397 A | 1/1994 | Barkan et al. |
| 5,286,960 A | 2/1994 | Longacre, Jr. et al. |
| 5,296,690 A | 3/1994 | Chandler et al. |
| 5,304,786 A | 4/1994 | Pavlidis et al. |
| 5,378,883 A | 1/1995 | Batterman et al. |
| 5,418,862 A | 5/1995 | Zheng et al. |
| 5,446,271 A | 8/1995 | Cherry et al. |
| 5,455,414 A | 10/1995 | Wang |
| 5,463,214 A | 10/1995 | Longacre, Jr. et al. |
| 5,478,999 A | 12/1995 | Figarella et al. |
| 5,481,098 A | 1/1996 | Davis et al. |
| 5,486,689 A | 1/1996 | Ackley |
| 5,487,115 A | 1/1996 | Surka |
| 5,507,527 A | 4/1996 | Tomioka et al. |
| 5,514,858 A | 5/1996 | Ackley |
| 5,523,552 A | 6/1996 | Shellhammer et al. |
| 5,539,191 A | 7/1996 | Ackley |
| 5,550,366 A | 8/1996 | Roustaei |
| 5,557,091 A | 9/1996 | Krummel |
| 5,591,956 A | 1/1997 | Longacre, Jr. et al. |
| 5,612,524 A | 3/1997 | Sant'Anselmo et al. |
| 5,635,699 A | 6/1997 | Cherry et al. |
| 5,675,137 A | 10/1997 | Van Haagen et al. |
| 5,682,030 A | 10/1997 | Kubon |
| 5,691,527 A | 11/1997 | Hara et al. |
| 5,723,853 A | 3/1998 | Longacre, Jr. et al. |
| 5,739,518 A | 4/1998 | Wang |
| 5,756,981 A | 5/1998 | Roustaei et al. |
| 5,767,498 A | 6/1998 | Heske, III et al. |
| 5,777,309 A | 7/1998 | Maltsev et al. |
| 5,821,520 A | 10/1998 | Mulla et al. |
| 5,825,006 A | 10/1998 | Longacre, Jr. et al. |
| 5,872,354 A | 2/1999 | Hanson |
| 5,877,486 A | 3/1999 | Maltsev et al. |
| 5,889,270 A | 3/1999 | Van Haagen et al. |
| 5,914,476 A | 6/1999 | Gerst, III et al. |
| 5,932,862 A | 8/1999 | Hussey et al. |
| 5,936,224 A | 8/1999 | Shimizu et al. |
| 5,949,052 A | 9/1999 | Longacre, Jr. et al. |
| 5,974,200 A * | 10/1999 | Zhou et al. ............... 382/298 |
| 6,000,612 A | 12/1999 | Xu |
| 6,053,407 A | 4/2000 | Wang et al. |
| 6,075,883 A | 6/2000 | Stern et al. |
| 6,082,619 A | 7/2000 | Ma et al. |
| 6,088,482 A | 7/2000 | He et al. |
| 6,095,422 A | 8/2000 | Ogami |
| 6,123,261 A | 9/2000 | Roustaei |
| 6,158,661 A | 12/2000 | Chadima, Jr. et al. |
| 6,176,428 B1 | 1/2001 | Joseph et al. |
| 6,189,792 B1 | 2/2001 | Heske, III |
| 6,206,289 B1 | 3/2001 | Sharpe et al. |
| 6,234,395 B1 | 5/2001 | Chadima, Jr. et al. |
| 6,234,397 B1 | 5/2001 | He et al. |
| 6,250,551 B1 | 6/2001 | He et al. |
| 6,298,176 B2 | 10/2001 | Longacre, Jr. et al. |
| 6,340,119 B2 | 1/2002 | He et al. |
| 6,371,373 B1 * | 4/2002 | Ma et al. ............... 235/462.1 |
| 6,398,113 B1 | 6/2002 | Heske, III |
| 6,405,925 B2 | 6/2002 | He et al. |
| 6,454,168 B1 | 9/2002 | Brandt et al. |
| 6,490,376 B1 | 12/2002 | Au et al. |
| 6,491,223 B1 | 12/2002 | Longacre, Jr. et al. |
| 6,505,778 B1 | 1/2003 | Reddersen et al. |
| 6,513,714 B1 | 2/2003 | Davis et al. |
| 6,513,715 B2 | 2/2003 | Heske, III |
| 6,918,539 B2 | 7/2005 | Nakajima et al. |
| 7,028,911 B2 | 4/2006 | Cheung et al. |
| 2004/0026510 A1* | 2/2004 | Cheung et al. ......... 235/462.1 |

* cited by examiner

METHODS AND APPARATUS FOR READING BAR CODE IDENTIFICATIONS

BACKGROUND OF INVENTION

The invention pertains to digital data processing and, more particularly, to image analysis. It has application, by way of non-limiting example, in the reading of bar codes and, particularly, two-dimensional bar codes.

Though of only relative recent advent, bar codes are used throughout the marketplace. The linear bar code was first adopted by a trade association in the 1970's and is now used on products shipped and sold throughout the industrial world. The most common code, known as the UPC (uniform product code) in the United States, is a combination twelve to fourteen human-readable characters and corresponding machine-readable bars (or symbols) that uniquely identify products labeled in conformance with the UPC system. The bars are automatically interpreted by readers, i.e., "bar code readers," and used to look-up manufacturer and product names, as well as pricing, inventory and other product-related information, in computer databases.

Early success of the linear bar code led to its extension into so-called stacked (or multi-row) codes and into two-dimensional (2D) codes. Stacked codes comprise a set of two or more linear bar codes placed vertically adjacent one another to encode two or more respective codes. An example is the four-deep stacked code used in the automobile industry to encode part number, quantity, supplier, and serial number. Another example it the Codablock symbology.

2D bar codes encode information along two axes—not just one, as is the case of the linear (1D) bar code. They can be used to encode a considerable amount of information in a small area. Though one of the most recognizable uses of 2D bar codes is on parcel shipping labels, they are increasingly used by manufactures to mark products themselves—not merely packaging. Examples include semiconductor wafers, milled products (such as turbine blades), surgical instruments, recyclable containers, glassware, among others. Common 2D bar codes are Maxicode, MiniCode, PDF 417, ArrayTag, DataGlphys, and DataMatrix, to name a few.

As the use of bar codes extends to manufactured products, the challenges facing makers of bar code readers increase. The patterns that make up 2D bar codes on freshly printed paper labels are readily interpreted by conventional scanning wands or fixed-mount readers. This is not the case with bar codes on damaged labels (e.g., wrinkled or smudged labels) nor with those formed on other surfaces, such as those of semiconductor wafers, surgical instruments and other manufactured goods themselves, by way of example.

An object of this invention is to provide improved methods for digital data processing and, more particularly, for image analysis. A more particular object is to provide such improved methods and apparatus for reading of bar codes.

A related object of the invention is to provide such improved methods and apparatus for reading stacked-linear and two-dimensional bar codes, among others.

Yet still another object of the invention is to provide such improved methods and apparatus as facilitate the reading of bar codes on manufactured goods, damaged labels and other surfaces.

Still other objects are to provide improved methods and apparatus for optical character recognition and other forms of machine vision analysis.

SUMMARY

The aforementioned are among the objects attained by the invention which provides, in one aspect, methods for analysis of images of two-dimensional (2D) bar codes in which multiple models that have proven successful in reading prior bar code images are utilized to speed analysis of subsequent bar code images. In its various aspects, the invention can be used in analyzing conventional 2D bar codes, e.g., those complying with Maxicode and DataMatrix standards (by way of example), as well as stacked linear bar codes, e.g., those utilizing the Codablock symbology (again, by way of example).

Bar code readers, digital data processing apparatus and other devices operating in accord with such methods can be used, by way of non-limiting example, to read bar codes from damaged labels, as well as those that are screened, etched, peened or otherwise formed on manufactured articles. In addition, devices utilizing such methods can speed bar code reading in applications where multiple bar codes of like type are read in succession and/or are read under like circumstances (e.g., image acquisition angle, lighting conditions, and so forth)—e.g., on the factory floor, at point-of-sale locations, in parcel delivery and so forth. Such devices can also speed and/or make possible bar code analysis in applications where multiple codes are read from a single article—e.g., as in the case of a multiply-coded airplane propeller or other milled part.

More particular aspects of the invention provide methods as described above for reading two-dimensional (2D) bar codes of the type having machine-readable components that comprise a plurality of bars, dots or other machine-readable symbols encoding product information or other data. The methods comprise analyzing a 2D image of a first 2D bar code to decode the machine-readable symbols thereof; discerning a model of representation of the first 2D bar code in that image (where the model comprises one or more geometric or other characteristics of that representation); and testing, for error, data decoded from the machine-readable symbols decoded using that model. These steps are executed so as to develop multiple (i.e., two or more) different models that have tested successfully in decoding 2D bar codes from 2D images.

Following analysis of the first bar code images and development of those multiple models, the methods call for analyzing a 2D image of a further 2D bar code. This includes using a model discerned in analysis of the first bar code images to decode the machine-readable symbols of the further 2D bar code. That previously-developed model is used in lieu of a model discerned from the image of the further 2D bar code itself—thereby saving the time and processing resources. The symbols determined from the further bar code image (again, using models discerned from the first bar code images) can be tested for error, e.g., insuring that utilization of the previously-discerned model was appropriate. If the testing proves unsuccessful, one or more of the other previously developed models is tried.

According to related aspects of the invention, the first and further bar codes can be analyzed from different images or from portions of the same underlying image (e.g., as where multiple bar codes are disposed on a single article and/or multiple bar code images are otherwise acquired in a single acquisition).

Related aspects of the invention provide such methods in which a model discerned from the image of a first 2D bar code is one defined by geometric or other characteristics that are not expected to vary substantially from image-to-image and, more particularly, as between the image of that first 2D bar code and the image of the further 2D bar code.

Such characteristics, according to various aspects of the invention include the height and/or width of the bar code in the image. Thus, for example, bar code height and/or width used in successful analysis of a first 2D bar code image is used to interpret bar codes in subsequent images, e.g., without the necessity of re-analyzing the images to determine such heights and/or widths. Other related aspects of the invention provide such methods in which the model defines characteristics such as number of bar code rows and/or columns; bar code symbol type (e.g., round, annular, rectilinear, etc.), bar code color, intensity and/or contrast, and imaging geometry (e.g., skew).

Other aspects include methods as described above as applied to the range of stacked-linear bar codes and 2D bar codes.

Yet other aspects of the invention include methods as described above as are applied in reading multiple bar codes from a single products, package or other article.

Still other aspects of the invention provide bar code readers, digital data processing and other apparatus for performing methods as described above.

Yet other aspects of the invention provide methods and bar code readers as described above for use in hand-held bar code reading and fixed-mount bar code reading applications.

Still other aspects of the invention provide methods and apparatus as described above that are used in optical character recognition and other image-based analysis applications.

BRIEF DESCRIPTION OF DRAWINGS

A more complete understanding of the invention may be attained by reference to the drawings, in which.

DETAILED DESCRIPTION OF THE ILLUSTRATED EMBODIMENT

Figure 1:
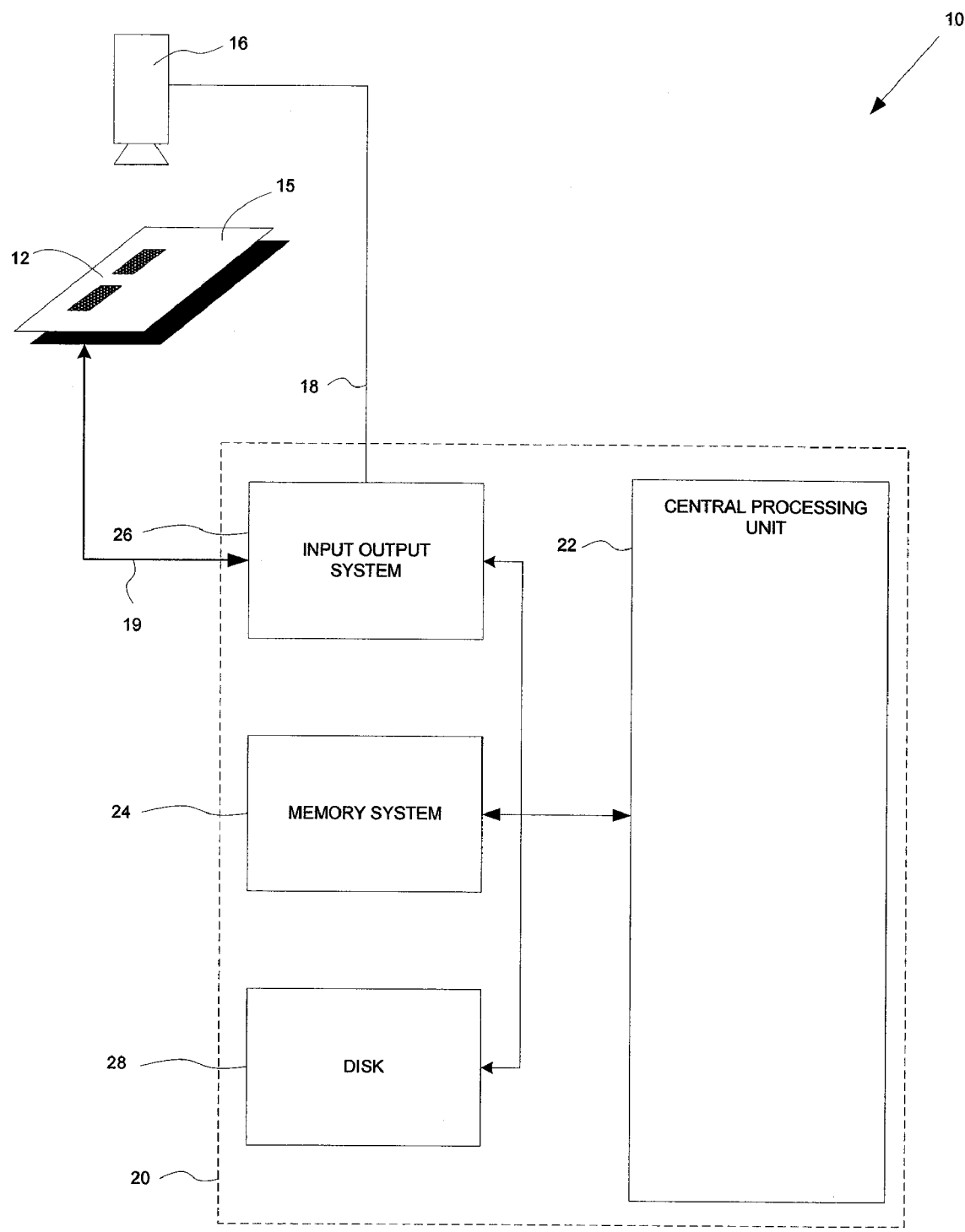
FIG. 1 depicts a system 10 according to the invention for reading 2D bar codes.

FIG. 1 depicts a system 10 according to the invention for reading 2D bar codes. The system 10 includes a bar code reader 16 that captures a two-dimensional image of a bar code 12 (or bar codes) to be read. The reader 16 can be a charge coupled device (CCD) camera, video camera or other image camera device of the conventional type available in the marketplace. Digital image data (or pixels) generated by the reader 16 represent, in the conventional manner, the image color and/or intensity of each point in the field of view of that capture device—here, a field of view that includes the bar code (or bar codes) 12 and, optionally, aspects of the article 14 (e.g., package, manufactured good, semiconductor wafer, or so forth) on which it/they are disposed. In the illustration, that article is, itself, disposed on a conveyance 15 capable of translating and/or rotating the article, such as may be the case in a warehouse, factory, or other environment where articles bearing bar codes may exist.

Digital image data is transmitted from reader 16 via a communications path 18 to the image analysis system 20. This can be a conventional digital data processor, or a vision processing system of the type commercially available from the assignee hereof, Cognex Corporation, as programmed in accord with the teachings hereof for analysis of bar code images acquired by the reader 16. The image analysis system 20 may have one or more central processing units 22, main memory 24, input-output system 26, and disk drive (or other mass storage device) 28, all of the conventional type.

The system 10 and, more particularly, central processing unit 22, is configured by programming instructions according to teachings hereof for operation as further described and illustrated herein. Those skilled in the art will appreciate that, in addition to implementation on a programmable digital data processor, the methods taught herein can be implemented in special purpose hardware.

As used hereinafter, the term two-dimensional or 2D bar code refers an industry-standard, proprietary or other bar code having (i) one or more bars, dots and/or other machine-readable symbols whose patterns vary along more than one axis and that encode information in a manner intended principally for interpretation by a machine, e.g., a bar code reader and, optionally, having (ii) one or more human-readable characters (such as letters and numbers) intended principally for interpretation by a human or optical character recognizer. This includes industry standard bar codes, such as Maxicode, MiniCode, PDF 417, ArrayTag, DataGlyphs, and DataMatrix, to name but a few. This also includes stacked one-dimensional bar codes, such as Codablock, to name but one example. This does not include one-dimensional (or "linear") bar codes, the pattern of whose machine-readable symbols (typically, bars) vary only along one dimension—although, the invention may have application in reading such bar codes, as well.

By way of corollary, as used herein, the terms analysis, reading, decoding, interpretation (or the like) of bar codes refers to the automated analysis of the above-mentioned machine-readable symbols, not the optical recognition of the above-mentioned human-readable characters. (Although, of course, in embodiments of the invention for reading characters, the terms analysis, reading, decoding, interpretation do indeed refer to automated analysis of such human-readable symbols, i.e., characters).

Figure 2:
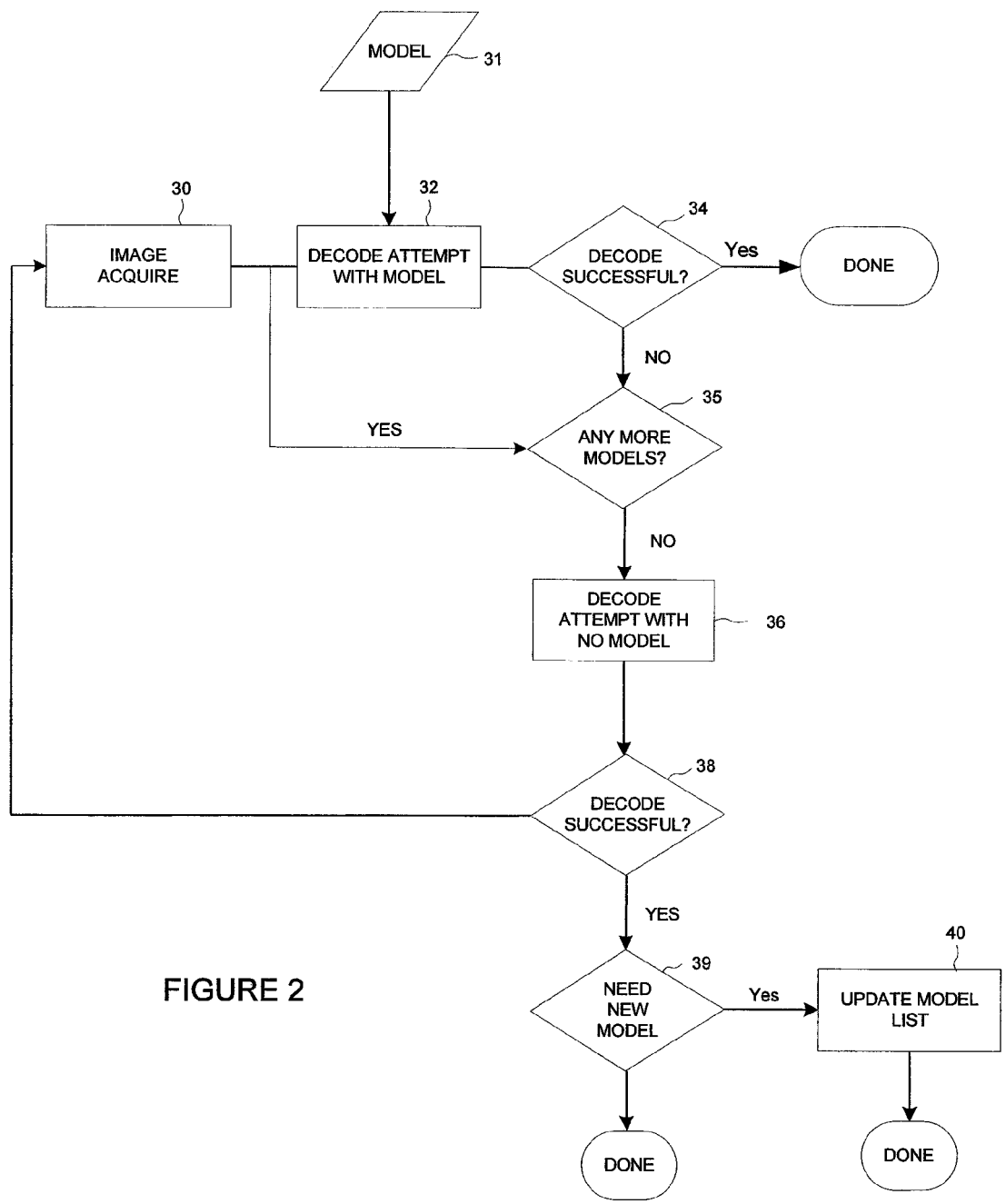
FIG. 2 depicts a methodology for 2D bar code analysis in accord with practice of the invention.

FIG. 2 depicts a methodology for 2D bar code analysis in accord with practice of the invention. In step 30, a bar code image is acquired. As noted above, this is a 2D image of the type generated by a CCD camera, video camera or other conventional image acquisition device. For purposes of the discussion that follow, the image is assumed to be of a single 2D bar code to be analyzed, In practice, such a bar code may occupy only a portion of an actual image acquired by the camera 16, in which case windowing or other appropriate pre-processing is executed in order that the processing performed in the steps described below may be applied to a single such bar code image at a time.

In step 32, a method according to the invention attempts to decode the subject bar code image with a current model—if one has yet been developed—of bar code characteristics learned from a prior successful reading of a bar code (e.g., a bar code previously imaged by reader 16 and decoded by system 20). The step is performed in the conventional manner known in the art and involves application of machine vision tools to identify the individual bars, dots or other symbols that make up the machine-readable portions of the 2D bar code and/or the patterns formed thereby, and to discern from the relative position, size, orientation and/or shape thereof the underlying data. Use of the model speeds the analysis, constraining degrees of freedom and reducing the number of tests otherwise necessary to identify the parameters or characteristics of bar code presentation in the image.

And, indeed, to insure that excessive processor and/or real time are not expended during this first decode step 32, a watchdog or other timer (not shown) is provided. It is set so that the vision tools applied during this step can decode a bar code image if the current model applies, but not otherwise. This ensures that bar codes whose imaging characteristics match the current model will be recognized quickly, and that those that do not (match) will force determination of a new model in the steps that follow—thereby, speeding recognition of future bar code images having characteristics of the current one.

As used herein, a model is a set of one or more characteristics of presentation of that bar code in that image—which characteristics are not expected to vary substantially from image-to-image and under the circumstances on in the environment under which those images are acquired. This includes, by way of non-limiting example, one or more of the following characteristics: the height and/or width of the at least the machine-readable component of the bar code; the number of rows and/or columns of the machine-readable component; the geometry of symbol that makes up the bar code, e.g., bar, dot, annulus, round, rectilinear, and so forth; symbol appearance in the image, e.g., intensity and/or contrast; and imaging geometry, e.g., location of bar code image, skew, and so forth. Other characteristics may be employed, in addition or instead, in other embodiments. However, as used herein, the model does not encompass the characteristic of basic symbology type, e.g., Maxicode versus MiniCode versus PDF 417, and so forth. In embodiments of the invention, basic symbology type is taken by default, or otherwise, and is not represented in the model per se. In FIG. 2, the set of characteristics that make up the model are identified as element 31.

In step 34, a method according to the invention tests if data was successfully decoded in step 32. This fails if the decoded data does not pass the various bit-wise, row-wise, column-wise and other checks dictated under applicable specifications of the 2D bar code whose image is being analyzed. It is also typically expected to fail if there had been no current model at the time of execution of step 32 (e.g., as would be the case if this were the first of a succession bar code reads) or if the current models are not adequate to enable the even basic symbol recognition.

If the decode was successful, processing is completed (see the "Yes" path from step 34). Typically, the decoded data is output and the bar code reader 16 and/or image analysis system 20 are readied for reading another bar code.

On the other hand, if test step 34 shows that decode step 32 was not successful, processing proceeds to step 35, where a test is made to determine whether additional previously successful models have been developed. If so, processing returns to step 32 and an attempt is made to decode the subject bar code image with one of those models. If not, processing proceeds to step 36, where an attempt is made to decode the bar code image without a model. As above, decoding is performed in the conventional manner known in the art and involves application of machine vision tools to identify the individual bars, dots or other symbols that make up the machine-readable portions of the 2D bar code and/or the patterns formed thereby, and to discern from the relative position, size, orientation and/or shape thereof the underlying data. Unlike the model-based analysis of step 32, that of step 36 typically utilizes more tests and/or searches over larger areas of a solution space to perform the decode.

As such, though a watchdog or other timer (not shown) is provided to insure that excessive processor and/or real time are not expended during decode step 36, that timer is typically set for a longer period than that used in timing step 32. Specifically, it is set so that the vision tools applied during step 36 can decode a reasonably formed bar code image, but not otherwise. This ensures that bar codes images amenable to decoding are so, but ultimately forces reacquisition of images of bar codes that are too ill-formed.

In step 38, the illustrated method tests if data was successfully decoded in step 36. As above, testing involves various bit-wise, row-wise, column-wise and other checks dictated under applicable bar code specifications for the 2D bar code whose image is being analyzed. If the decode was successful, processing proceeds to step 38–40. There, the list of current 31 models (used in step 32) is updated to reflect geometric and other imaging characteristics of the bar code successfully decoded in step 36. The decoded data is also output and the bar code reader 16 and/or image analysis system 20 are readied for reading another bar code.

If the decode in step 36 had not been successful, on the other hand, the illustrated method loops back, as shown, to step 30. There, a new image of the bar code is acquired and decoding and testing begun anew. In other embodiments, the loop-back can be directly to step 32 if, for example, if there are further models to use in decoding of the image—e.g., models successful in still earlier read attempts.

Further embodiments of the invention apply the methodologies and apparatus above to optical character recognition and other image-based analysis. In these embodiments, for example, images "first" sequences of one or more characters are analyzed to discern multiple model of the type described above, here, however, characterizing geometric and other image-wise invariant parameters (e.g., font, image intensity, color, contrast, etc.) of representation of the character(s) in those images These model are used to discern the characters in images of one or more further character sequences. In the later regard, as above, analysis of the further character sequence images is based on the models discerned from the "first" images, not on ones separately derived from the further images. However, also as above, in the event that the current (i.e., previously developed) models timely or otherwise fail to result in correct analysis of a further character sequence, embodiments using these methods can engage in a more in-depth analysis of the further sequence, possibly, retaining a model learned from it for use in analysis of subsequent images.

Described above are methods and apparatus meeting the desired objects. It will be appreciated that the embodiments discussed here are merely examples of the invention and that other embodiments incorporating changes therein fall within the scope of the invention. Thus, for example, it will be appreciated that model comprising characteristics other than those described above may be used and that multiple models may be applied before attempting a decode with no model.

In view of the forgoing, what we claim is:

1. A method of reading two-dimensional (2D) bar codes of the type having a machine-readable component and, optionally, having a human-readable component, where the machine-readable component comprises a plurality of bars, dots or other machine-readable symbols (collectively, "machine-readable symbols") encoding data, the method comprising;

(A) providing multiple models, each discerned from a successful respective decode of a 2D image of a 2D bar code, (B) analyzing a 2D image of a further 2D bar code to decode the machine-readable symbols thereof, the analyzing step including (i) using a model provided in step (A) to determine the machine-readable symbols of the further 2D bar code in the image thereof, where that model is used in lieu of one discerned from the image of the further 2D bar code, (ii) testing for error data so decoded from the machine-readable symbols of the further 2D bar code, (B) responding to an unfavorable result in step (B)(ii) by executing step (C) with each of one or more additional models provided in step (A), (D) responding to an unfavorable result in execution of step (B)(ii) per step (C) by analyzing said 2D image of said further 2D bar code to decode the machine-readable symbols thereof, the analyzing step including (i) discerning from that image a model of representation of the further 2D bar code therein, where that model comprises one or more characteristics of that representation and (ii) testing for error data so decoded from the machine-readable symbols of the further 2D bar code, (E) responding to a favorable result in step (D)(ii) by using said model discerned in step (D)(i) in further execution of one or more of steps (B) and (C), and (F) where the 2D image of the further 2D bar code may comprise all or portions of the same 2D image or images from which the models were discerned.

2. The method of claim 1, wherein step (A) comprises analyzing a 2D image of a first 2D bar code to decode the machine-readable symbols thereof, the analyzing step including (i) discerning from that image a said model of representation of the first 2D bar code therein, where that model comprises one or more characteristics of that representation and (ii) testing for en-or data so decoded from the machine-readable symbols of the first 2D bar code.

3. The method of claim 2, wherein step (A) includes discerning a model having one or more characteristics that are geometric characteristics of the first 2D bar code in the image thereof and which one or more characteristics are not expected to vary substantially as between the image of the first 2D bar code and the image of the further 2D bar code.

4. The method of claim 2, wherein step (A) includes discerning from the image of the first 2D bar code a model having one or more characteristics that are any of intensity and/or contrast of the first 2D bar code in the image.

5. The method of claim 4, wherein the one or more characteristics are not expected to vary substantially from image-to-image and under the circumstances in which those images are acquired.

6. The method of claim 2, wherein the model step (A) includes discerning from the image of the first 2D bar code a model having one or more characteristics that are not expected to vary substantially as between the image of the first 2D bar code, the image of the further 2D bar code and the images of one or more further bar codes.

7. The method of claim 1, comprising limiting a period of time and/or expenditure of other digital data processing resources in performing step (B)(i).

8. The method of claim 7, wherein the geometric characteristics include the height and/or width of at least the machine-readable component of the first 2D bar code in the image thereof.

9. The method of claim 7, wherein the geometric characteristics include a number of rows and/or columns in the machine-readable component of the first 2D bar code.

10. The method of claim 7, wherein the geometric characteristics include a geometry of symbols that makes up the bar code.

11. The method of claim 7, wherein the geometric characteristics include an imaging geometry of the first 2D bar code in the image thereof.

12. A method of reading two-dimensional (2D) bar codes of the type having a machine-readable component and, optionally, having a human-readable component, where the machine-readable component comprises a plurality of bars, dots or other machine-readable symbols (collectively, "machine-readable symbols") encoding data, the method comprising:

(A) acquiring a 2D image of each of multiple first 2D bar codes, (B) analyzing the 2D image of each of the first 2D bar codes to decode the machine-readable symbols thereof, the analyzing step including (i) discerning from among a plurality of possibilities a model of representation of the first 2D bar code in the image thereof, where that model comprises one or more geometric characteristics of that representation that are expected to be substantially invariant as among images of a plurality of bar codes, and (ii) testing for error data so decoded from the machine-readable symbols (C) acquiring one or more further 2D images of one or more further 2D bar codes, where the 2D images of the first 2D bar codes and the 2D images of the further 2D bar code may comprise all or portions of one or more 2D images, (D) analyzing one or more of the 2D images of a said further 2D bar code to decode the machine-readable symbols thereof, the analyzing step including (i) using a said model discerned in step (B)(i) to decode the machine-readable symbols of that further 2D bar code in the image thereof, where that model is used in lieu of ones discerned from that image of the further 2D bar code itself, (ii) testing for error data so decoded from the machine-readable symbols of the further 2D bar code, (E) responding to an unfavorable result in step (D)(ii) by executing step (D) with each of one or more additional models discerned in step B(i)

(F) responding to unfavorable result in execution of step (D)(ii) per step (E) by executing step (B) with one or more 2D images of said further 2D bar code, (G) responding to favorable testing in execution of step (B)(ii) per step (F) by using a model discerned in execution of step (B)(i) per step (F) in further execution of one or more of steps (D) and (E).

13. The method of claim 12, wherein steps (A) and (C) including acquiring the images from a common image acquisition device.

14. The method of claim 13, wherein the common image acquisition device is any of a fixed and hand-held device.

15. The method of claim 12 comprising limiting a period of time and/or expenditure of other digital data processing resources in performing step (D)(i).

16. A digital data processing apparatus operating in an accord with the method of any of claims 1 and 12.

17. A bar code reader operating in an accord with the method of any of claims 1 and 12.

18. A method of optical character recognition comprising;

(A) providing multiple models, each discerned from a successful respective recognition of sequence of one or more characters in a two-dimensional (2D) image thereof, (B) analyzing an image of a further character sequence comprising one or more characters, the analyzing step including using a model provided in step (A) to discern the characters that make up the further character sequence, where that model is used in lieu of one discerned from the image of the further character sequence itself, and (C) responding to an absence of success in step (B) by re-executing that step with each of one or more additional models provided in step (A)

(D) responding to an absence of success in re-execution of step (B) per step (C) by analyzing one or more 2D images of said further character sequence to decode the characters therein, the analyzing step including (i) discerning from that image a model of representation of the further character sequence in that image, where that model comprises one or more characteristics of that representation and (ii) testing for error characters so decoded from the machine-readable symbols of the further character sequence, (E) responding to a favorable result in step (D)(ii) by using a model discerned in step (D)(i) in further execution of one or more of steps (B) and (C).

19. The method of claim 18, wherein step (A) comprises analyzing a 2D image of a first character sequence to decode the characters therein, the analyzing step including (i) discerning from that image a said model of representation of the first character sequence in that image, where that model comprises one or more characteristics of that representation and (ii) testing for error characters so decoded from the first character sequence.

20. The method of claim 19, wherein step (A) includes discerning a model having one or more characteristics that are geometric characteristics of the first character sequence in the image thereof and which one or more characteristics are not expected to vary substantially as between the image of the first character sequence and the image of the second character sequence.

21. The method of claim 20, wherein the geometric characteristics include the height and/or width of the characters in the first character sequence in the image thereof.

22. The method of claim 21, wherein the geometric characteristics include a geometry of characters that make up the first character sequence.

23. The method of claim 22, wherein the geometric characteristics include an imaging geometry of the first character sequence in the image thereof.

24. The method of claim 19, wherein step (A) includes discerning from the image of the first character sequence a model having one or more characteristics that are any of intensity and/or contrast of the first character sequence in the image.

25. The method of claim 19, wherein the model step (A) includes discerning from the image of the first character sequence a model having one or more characteristics that are not expected to vary substantially as between the image of the first character sequence and the image of the further character sequence.

26. A digital data processing apparatus operating in an accord with the method of any of claims 18–25.

27. A method of optical character recognition comprising:

(A) providing multiple models, each discerned from a successful analysis of one or more symbols in a respective two-dimensional (2D) image thereof, (B) analyzing an image of a further sequence comprising one or more symbols, the analyzing step including (i) using a model provided in step (A) to discern the symbols that make up the further character sequence, where that model is used in lieu of one discerned from the image of the further character sequence itself.

(C) responding to an absence of success in step (B) by re-executing that step with each of one or more additional models provided in step (A)

(D) responding to an absence of success in re-execution of step.(B) per step (C) by analyzing one or more 2D images of said further character sequence to decode the characters therein, the analyzing step including (i) discerning from that image a model of representation of the further character sequence in that image, where that model comprises one or more characteristics of that representation and (ii) testing for characters decoded from the further character sequence, and (E) responding to a favorable result in step (D)(ii) by using a model discerned in step (D)(i) in further execution of one or more of steps (B) and (C).

* * * * *